Aug. 1, 1950
C. J. WESTON
2,517,151
MATERIAL HAULING AND DISPENSING VEHICLE
Filed Feb. 6, 1947
2 Sheets-Sheet 1
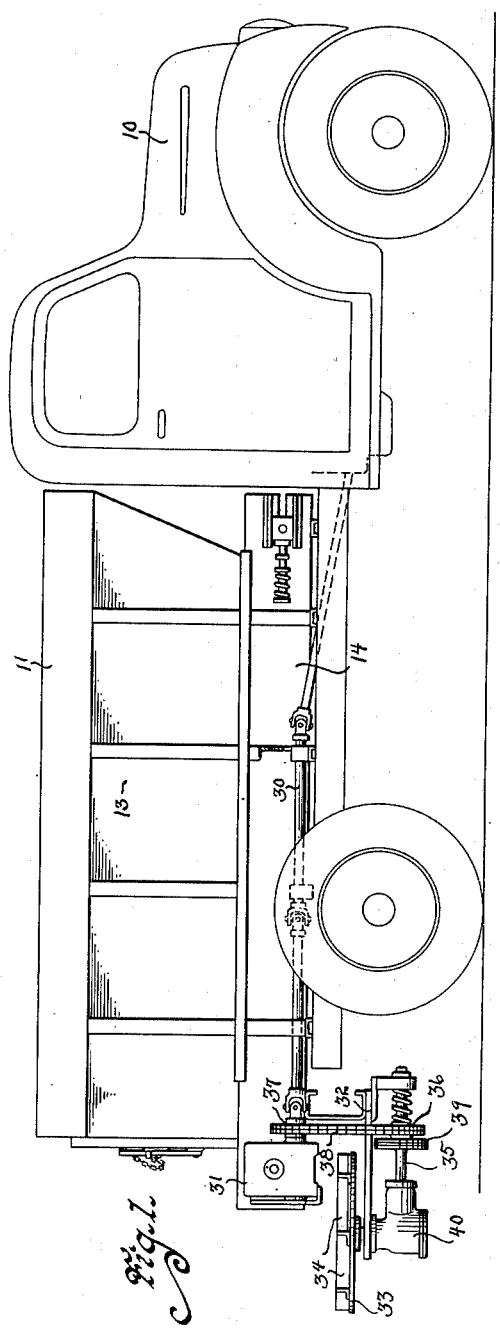
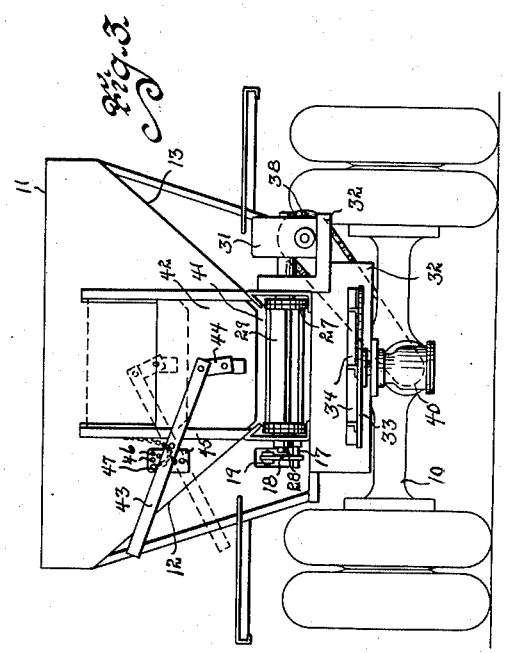
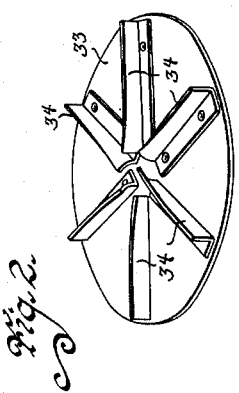
Inventor
Clarence J. Weston
by M. Talbert Dick
Attorney
Witness
Edward P. Seeley

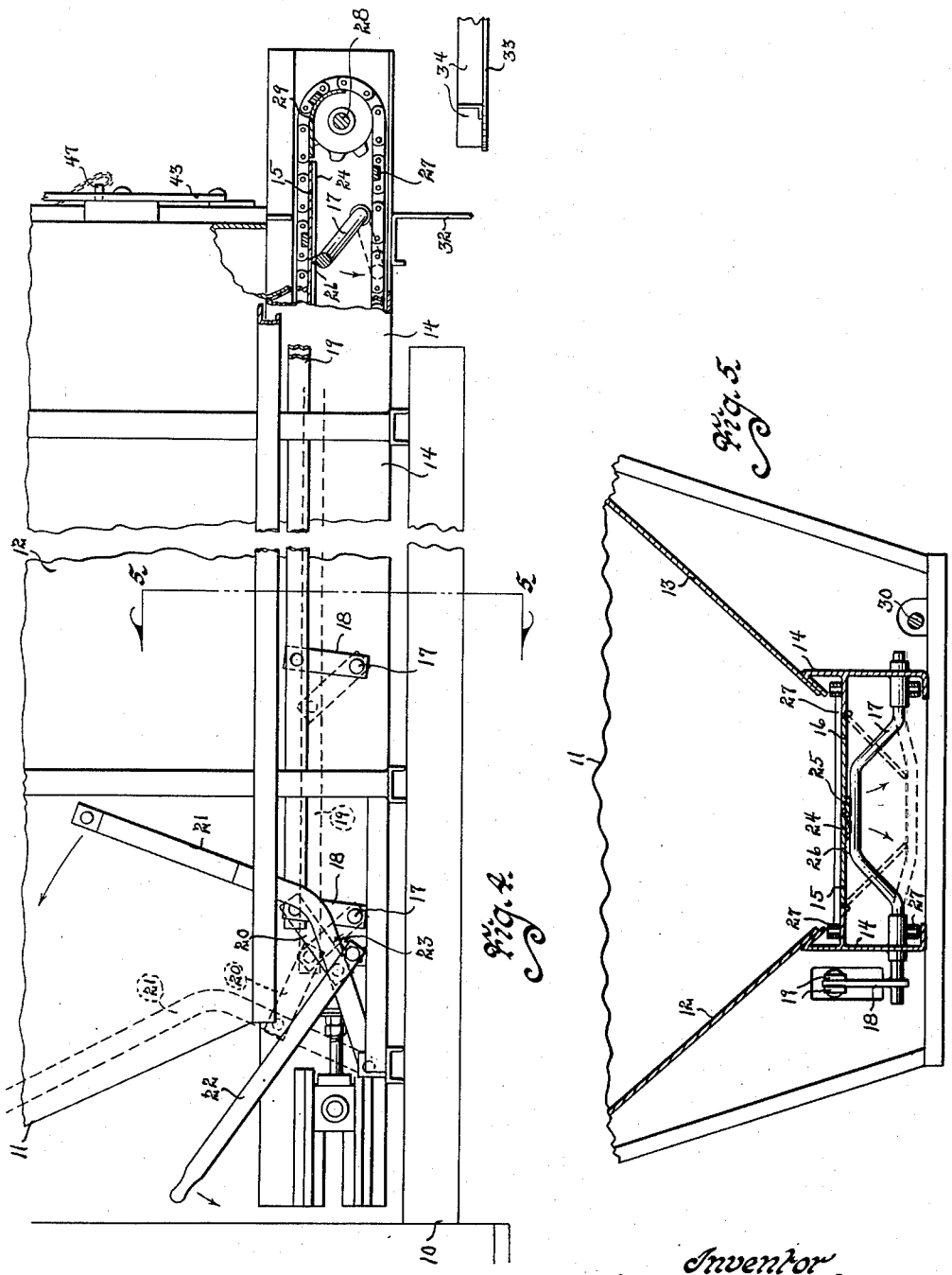

Patented Aug. 1, 1950

2,517,151

UNITED STATES PATENT OFFICE 2,517,151

MATERIAL HAULING AND DISPENSING VEHICLE

Clarence J. Weston, Des Moines, Iowa

Application February 6, 1947, Serial No. 726,901

1 Claim. (Cl. 214—83.18)

1

This invention relates to vehicles primarily used for hauling and spreading fertilizing materials such as lime or like over fields.

The principal object, therefore, of my invention is to provide a highly efficient and durable apparatus for hauling and spreading materials over surfaces in need of such materials.

A still further object of my invention is to provide a material hauling vehicle that will dump the load being hauled at a given location, or if desired, will automatically disperse the material over a wide area while the vehicle is in movement.

A still further object of my invention is to provide a material spreading apparatus that may be easily and quickly adjusted to spread a given amount of material over a given area.

A still further object of my invention is to provide a material dispenser and spreader that disperses the material from a low point above the surface to be treated.

Still further objects of my invention are to provide a material hauling and dispensing vehicle that is economical in manufacture and refined in appearance.

These and other objects will be apparent to those skilled in the art.

My invention consists in the construction, arrangement and combination of the various parts of the device, whereby the objects contemplated are attained as hereinafter more fully set forth, pointed out in my claim and illustrated in the accompanying drawings, in which:

Fig. 1 is a side view of my vehicle ready for use.

Fig. 2 is an enlarged perspective view of a rotatably mounted material spreader.

Fig. 3 is a rear end view of my vehicle.

Fig. 4 is a side-sectional view of a portion of the rear end portion of my vehicle and more fully illustrates its construction.

Fig. 5 is a cross-sectional view of the hopper box portion taken on line 5—5 of Fig. 4.

Material hauling and spreading vehicles are old in the art. Such vehicles are used to spread lime and like fertilizers over fields and for spreading materials on roadways. The main objection to such devices, however, is that they permit only one way of disposing of the material being hauled. Obviously, in some situations it is desirable that the material be thrown horizontally from the hauling vehicle in order to cover a large area and in other instances it may be desirable to dump the load of material in a given spot for future use, or spread in a narrow path between the wheels of the vehicle as the vehicle progresses. My vehicle is capable of hauling the material, spreading it over a wide area, or dumping the material, or causing it to deposit in an elongated row.

2

In the drawings, I have used the numeral 10 to designate an ordinary automotive vehicle and chassis. It is to such a chassis that I install my device and which I will now describe in detail. The numeral 11 designates the vehicle material hauling box having its two sides 12 and 13 extending downwardly and inwardly and terminating in a bottom opening which extends substantially the entire center length of the box 11. The numeral 14 designates a rigid frame secured to and supporting the lower edges of the hopper box walls 12 and 13. This rigid frame extends the length of the bottom of the box and protrudes beyond the rear end of the box, as shown in Fig. 4. The numerals 15 and 16 designate doors facing each other and hinged at their outer sides to the frame 14, as shown in Fig. 5. These doors 15 and 16, when in closed positions, close the longitudinal opening in the bottom of the box, but when swung downwardly and outwardly, as shown by dotted lines in Fig. 5, they provide the elongated longitudinal outlet slot for the vehicle box. The numeral 17 designates a plurality of U-shaped crank shafts rotatably mounted in the frame 14 and under the outlet doors 15 and 16. When these crank shafts 17 are rotated to an inverted position, as shown in Fig. 5, they will raise and support the doors 15 and 16 in a closed position, but when rotated away from this direction, permit the doors 15 and 16 to open. The numeral 18 designates a link rigidly secured to each of the crank shafts 17. The numeral 19 designates a double bar pivoted to each of the members 18, as shown in Fig. 4. The numeral 20 designates a link hingedly secured at one end to the member 19 and its other end hingedly secured to the hand lever 21, which is in turn hingedly secured at one end to the box frame, as shown in Fig. 4. The handle 21 and link 20 are so positioned and arranged that when the lever 21 is moved rearwardly to close the doors 15 and 16 the lever is tripped past center, thereby holding the crank shaft 17 in an inverted upright position. The numeral 22 designates a second hand lever hingedly secured to the vehicle frame and having an engaging lug 23 capable of engaging the under side of the lever 21. As the pivot point of the lever 22 is between the pivot point of the lever 21 and the link 20 the downward movement of the lever 22 will raise the lever 21 past its past center locked position. With the lever 21 forward, as shown by dotted lines in Fig. 4, the crank shaft 17 will be rotated to a lowered position permitting the doors 15 and 16 to drop. By this arrangement, the doors 15 and 16 may be manually opened or closed. The numerals 24 and 25 designate strengthening strips on the bottom free ends of the doors 15 and 16 and ride on the crank shafts when they are in an elevated position. The member 25 extends beyond the free edge of the member 16 in order to close any gap that may exist between the free edges of the doors. In order that the door 15 will raise first and not jam with the member 25, I have provided a small lug 26 on each of the crank shafts which causes the door 15 to close slightly prior to the door 16. The numeral 27 designates a rotatably mounted endless chain conveyor riding on the frame 14 and embracing the doors 15 and 16 and crank shafts 17. This endless conveyor is of the conventional slat type and is actuated by the drive shaft 28. The numeral 29 designates a skirt secured to the rear end portion of the frame 14 and around which the conveyor operates at its rear end, as shown in Fig. 4. By this construction, when the doors 15 and 16 are in closed position and the endless conveyor is actuated, material will be moved from the box rearwardly on the doors 15 and 16 and thence onto and from the curved skirt 29. The numeral 30 designates a shaft rotatably mounted to the frame of the apparatus and operatively connected to the power take-off of the internal combustion engine of the vehicle, as shown in Fig. 1. The numeral 31 designates a gear box and gears operatively connecting the shaft 28 to the shaft 30. The numeral 32 designates the material spreading frame secured to the lower rear end portion of the vehicle box. The numeral 33 designates the horizontal material spreading disc having vertical curved blades 34 on its top surface and rotatably mounted on the frame 32. This member 33 is mounted directly below the skirt 29 and the rear end of the conveyor, as shown in Fig. 3. The numeral 35 designates a rotatably mounted shaft on the frame 32 and carrying a sprocket gear 36. The numeral 37 designates a sprocket gear on the shaft 30. The numeral 38 designates an endless chain embracing the sprocket gears 36 and 37. The numeral 39 designates a friction clutch imposed in the shaft 35. The numeral 40 designates a gear box and gears operatively connecting the shaft 35 to the rotatably mounted disc plate 33. The numeral 41 designates an opening in the rear of the box 11. The numeral 42 designates a vertically raisable and closable door on the rear end of the box capable of adjustably closing the opening 41. The numeral 43 designates a lever pivoted near its center to the box 11 and one of its ends pivotally connected to a link 44 which in turn is pivotally connected to the door 42. By this arrangement, when the free end of the member 43 is manually actuated the door will be adjustably opened or closed. To hold the door in any desired position of its elevation, I have provided a block 45 having a series of pin receiving holes 46. These holes are capable of individually receiving the pin 47 which engages the top of the member 43 to hold it in selected positions, as shown in Fig. 3.

The practical operation of my apparatus is as follows. The doors 42, 15, and 16 are closed and the material to be hauled and distributed is placed in the vehicle hopper box. If it is desired to spread the material over a wide area the door 42 is moved upwardly to permit the conveyor to move material rearwardly and under it. With the vehicle in motion and the shaft 30 rotating the material will be moved rearwardly by the conveyor and will fall on the rapidly rotating member 33 where it is struck by the vanes 34 and spread horizontally over a wide area. The amount of material spread over a given area will depend upon the adjusted elevated position of the door 42. If it is not desired to spread the material over a wide area it is merely necessary to open the doors 15 and 16 and the material will drop directly downwardly between the wheels of the vehicle. If the vehicle is moving the material will be deposited in an elongated ridge depending upon how wide the doors 15 and 16 are opened. If the vehicle is stopped and the doors 15 and 16 opened all of the material will be deposited under the vehicle. If it is desired, on the other hand, to adjustably feed the material out of the rear end of the vehicle and not spread it, it is merely necessary to keep the doors 15 and 16 closed and remove the chain 38. From the foregoing, it will be seen that with a single apparatus, I have provided a number of ways of dispensing the material.

Some changes may be made in the construction and arrangement of my improved material hauling and dispensing vehicle without departing from the real spirit and purpose of my invention, and it is my intention to cover by my claim any modified forms of structure or use of mechanical equivalents which may be reasonably included within its scope.

I claim:

In a device of the class described, a material hopper designed to be mounted on a vehicle and having its two side walls extending downwardly and sloping inwardly and terminating in an elongated opening, a rigid frame comprising parallel side walls welded to the sloping sides of the hopper adjacent the elongated opening, two depending doors pivoted to the parallel wall adjacent opposite edges of the opening and capable of being moved upwardly toward each other to close the bottom of the hopper, a pair of offset crank shafts rotatably mounted within the frame member in a position below the pivoted doors and capable of engaging the under sides of said doors for progressively controlling them into and out of closed positions with the bottom of the hopper, a lever means for actuating said crank shafts, said side walls terminating at their lower edges in inturned flanges which provide a track, and a rotatably mounted endless chain open-type conveyor embracing said doors and said crank shafts and supported and guided on said tracks, means for driving the conveyor lengthwise of the hopper, the opposite ends of the hopper having adjustable openings for free passage of the endless conveyor, said conveyor having one of its end portions extending from and out of the said hopper.

CLARENCE J. WESTON.

REFERENCES CITED

The following references are of record in the file of this patent:

UNITED STATES PATENTS

| Number | Name | Date |
|---|---|---|
| 484,491 | Campbell et al. | Oct. 18, 1892 |
| 800,162 | Koob | Sept. 26, 1905 |
| 1,166,476 | Parrish | Jan. 4, 1916 |
| 1,369,299 | Peterson | Feb. 22, 1921 |
| 1,880,155 | Ruth | Sept. 27, 1932 |
| 1,928,859 | Kutscha | Oct. 3, 1933 |
| 2,293,977 | Hoffstetter | Aug. 25, 1942 |
| 2,302,413 | Blackwelder et al. | Nov. 17, 1942 |
| 2,340,810 | Hoffstetter | Feb. 1, 1944 |
| 2,393,849 | Werts | June 29, 1946 |